(12) United States Patent
Tsai (10) Patent No.: US 8,122,651 B2
(45) Date of Patent: *Feb. 28, 2012

(54) SHOCK SUPPRESSOR

(76) Inventor: Chong-Shien Tsai, Taichung (TW)

(*) Notice: Subject to any disclaimer, the term of this patent is extended or adjusted under 35 U.S.C. 154(b) by 1455 days.

This patent is subject to a terminal disclaimer.

(21) Appl. No.: 11/638,996

(22) Filed: Dec. 13, 2006

(65) Prior Publication Data

US 2008/0078633 A1 Apr. 3, 2008

(30) Foreign Application Priority Data

Aug. 8, 2006 (TW) ................................ 95129080 A (51) Int. Cl.
*E04B 1/98* (2006.01)
(52) U.S. Cl. ....... 52/167.9; 52/167.1; 248/562; 248/636
(58) Field of Classification Search ................ 52/167.1, 52/167.4, 167.5, 167.6; 248/636, 560, 562, 248/566, 569, 583
See application file for complete search history.

(56) References Cited

U.S. PATENT DOCUMENTS

| | | | | |
|---|---|---|---|---|
| 4,883,250 A | * | 11/1989 | Yano et al. | 248/638 |
| 5,590,506 A | * | 1/1997 | Cunningham | 52/741.3 |
| 6,725,612 B2 | * | 4/2004 | Kim | 52/167.5 |

OTHER PUBLICATIONS

C.S. Tsai et al., Finite Element Formulation and Shaking Table Tests of Direction-Optimized-Friction-Pendulum System, Engineering Structures 30 (2008), 2321-2329.

* cited by examiner

*Primary Examiner* — Eileen D Lillis
*Assistant Examiner* — Alp Akbasli
(74) *Attorney, Agent, or Firm* — William E. Pelton; Cooper & Dunham LLP (57) ABSTRACT

A shock suppressor has a first base, a second base and a connecting device. The second base is parallel to the first base. The connecting device is slidably mounted between the first base and second base to connect the first and second bases and has a universal connector. The first base abuts against the connecting device in a curved contact surface to provide a first sliding mechanism in multiple directions. The second base abuts against the connecting device to provide a second sliding mechanism in a unidirection.

8 Claims, 12 Drawing Sheets

FIG.13 ered below the second base (20) as shown in
SHOCK SUPPRESSOR

BACKGROUND OF THE INVENTION

1. Field of the Invention

The present invention relates to a suppressor for a building, a bridge or a motion sensitive equipment, and more particularly to a shock suppressor that can dissipate seismic shock energy in both horizontal and vertical directions efficiently.

2. Description of Related Art

Effect of ground motions is very important factors to be considered in the design of a high building, a bridge or a skyscraper, from micro-vibrations to catastrophic earthquakes. Therefore, shock reduction is very important aspect in the construction of a building, a bridge or a skyscraper.

A conventional shock suppressor is provided to dissipate shock energy and substantially comprises a base, a supporting plate and a slider. The base and the supporting plate have respectively a recess corresponding to each other, and the slider are held slidably in the recesses in the base and the supporting plate. The slider comprises a first sliding block, a second sliding block and a ball. Each sliding block has a convex end corresponding to a corresponding recess and a concavity for holding the ball inside. With the sliding movement of the slider relative to the recesses in the base and the supporting plate, shock energy generated by earthquake can be dissipated.

However, the conventional shock suppressor can dissipate shock energy in multiple directions, but has a complicate structure. In addition, to define semispherical recesses in both the base and the supporting plate is difficult and time-consuming, and the cost for manufacturing the conventional shock suppressor is high. Furthermore, the conventional shock suppressor cannot be economically applied to bridges or an elongated building because that the dissipating frequencies and displacement capacities in different shock-dissipating directions of the conventional shock suppressor are the same.

To overcome the shortcomings, the present invention tends to provide a shock suppressor to mitigate or obviate the aforementioned problems.

SUMMARY OF THE INVENTION

The main objective of the invention is to provide a shock suppressor that can dissipate seismic shock energy in both horizontal and vertical directions efficiently. The shock suppressor has a first base, a second base and a connecting device. The second base is parallel to the first base. The connecting device is slidably mounted between the first base and second base to connect the first and second bases and has a universal connector. The first base abuts against the connecting device in a curved contact surface to provide a first sliding mechanism in multiple directions. The second base abuts against the connecting device to provide a second sliding mechanism in a unidirection.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 13, a shock suppressor in accordance with the present invention can be applied to a building, a bridge or an instrument and comprises a first base (10), a second base (20) and a connecting device (30). The second base (20) is parallel to the first base (10). The connecting device (30) is slidably mounted between the first base (10) and second base (20) to connect the first and second bases (10,20) and has a universal connector. The first base (10) abuts against the connecting device (30) in a curved contact surface to provide a first sliding mechanism in multiple directions. The second base (20) abuts against the connecting device (30) to provide a second sliding mechanism in a unidirection. A damping device (40) is mounted on at least one of the first base (10), the second base (20) and the connecting device (30). The damping device (40) can be made of resilient rubber material, viscoelastic material, frictional material or material with an excellent damping coefficient.

In practice, the locations of the first and second bases (10,20) can be exchanged based on different needs. The first base (10) can be mounted on the ground, the floor or a building and is located below the second base (20) as shown in FIGS. 1 to 12. In an alternative embodiment, the second base (20) can be mounted on the ground, the floor or a building and is located below the first base (10) as shown in FIG. 13.

Figure 1:
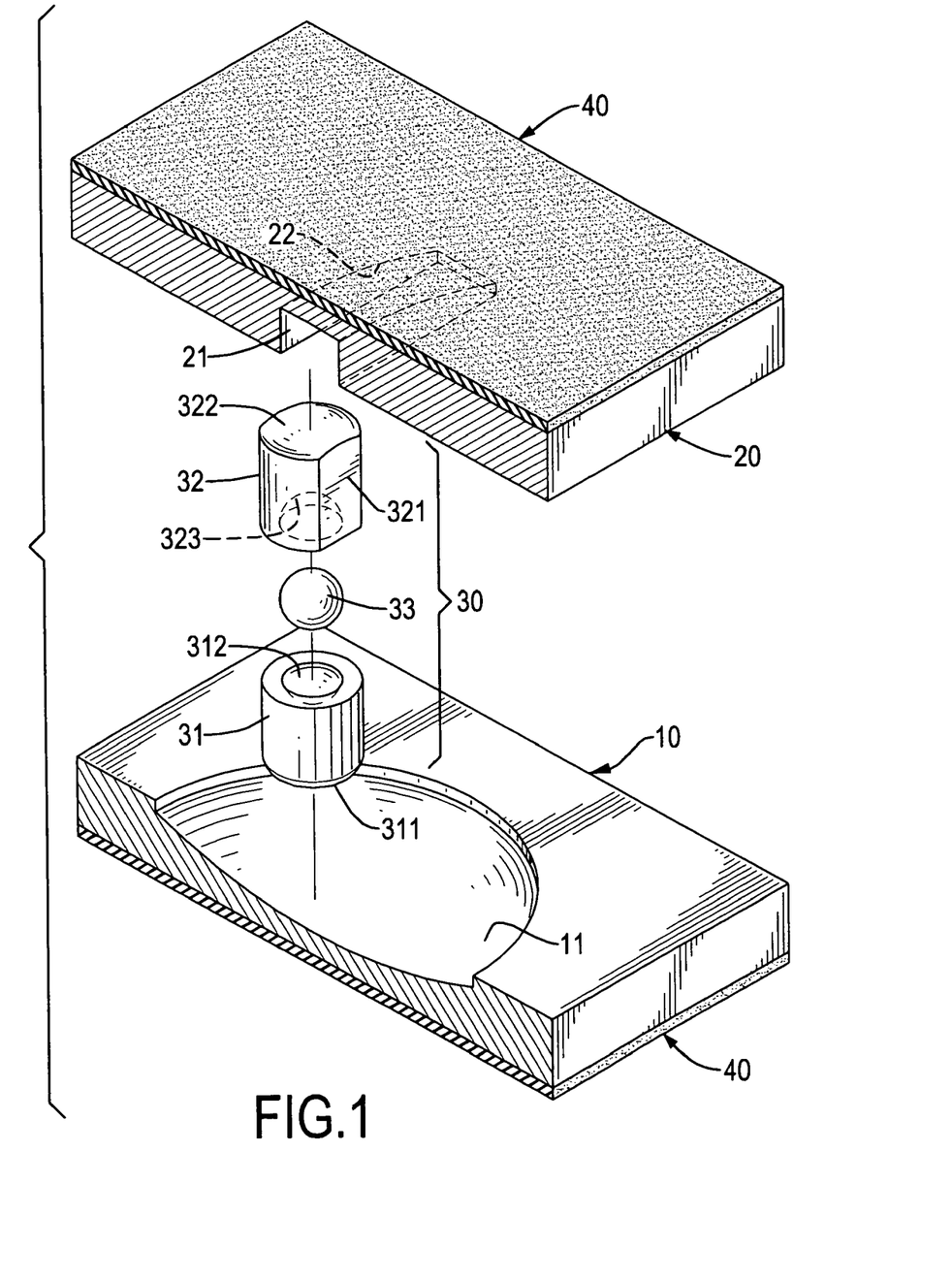
FIG. 1 is an exploded perspective view in partial cross section of a first embodiment of a shock suppressor in accordance with the present invention.

With reference to FIG. 1, in a first embodiment of a shock suppressor in accordance with the present invention, the first base (10) has a concave surface (11) defined in a side facing the second base (20). The second base (20) has a sliding channel (21) defined in a side facing the first base (10), and the sliding channel (21) has a concave surface (22) facing the first base (10). The damping device (40) comprises two damping pads attached respectively to the first and second bases (10, 20).

The connecting device (30) comprises a first slider (31) and a second slider (32). The first slider (31) abuts against the first base (10) and has a facing end facing to the second slider (32) and a convex surface (311) formed on the first slider (31) at an end opposite to the facing end and corresponding to and matching with the concave surface (11) in the first base (10). With the concave surface (11) in the first base (10) and the convex surface (311) on the first slider (31), the first sliding mechanism between the first base (10) and the connecting device (30) in a curved contact surface is achieved.

The second slider (32) abuts against the second base (20) and has a facing end facing to the first slider (31). The second slider (32) has a convex surface (322) formed on the second slider (32) at an end opposite to the facing end and corresponding to and matching with the concave surface (22) in the sliding channel (21) of the second base (20). With the sliding channel (21) in the second base (20) and the convex surface (322) on the second slider (32), the second sliding mechanism between the second base (20) and the connecting device (30) in a unidirectional sliding direction is achieved. In addition, the second slider (32) further has two guiding sides (321) respectively abutting against the inner sides of the sliding channel (21).

The universal connector is formed between the first slider (31) and the second slider (32) and comprises two recesses (312,323) and a supporting member (33). The recesses (312, 323) are defined respectively in the facing ends of the first slider (31) and the second slider (32). The supporting member (33) is rotatably mounted in the recesses (312,323) in the first and second sliders (31,32). In the first embodiment, the recesses (312,323) in the first and second sliders (31,32) are hemispherical, and the supporting member (33) is spherical.

In such an arrangement, the connecting device (30) can provide an excellent supporting effect to the supported structures including buildings, bridges, etc. before a shock occurring. When a shock occurs, the first base (10) will move relative to the second base (20). With the engagements of the first sliding mechanism between the first base (10) and the first slider (31), the second sliding mechanism between the second base (20) and the second slider (32), the universal connector between the sliders (31,32) and the damping device (40), the shock energy can be efficiently dissipated, eliminated, suppressed or absorbed in both horizontal and vertical directions.

When the shock has stopped, the first and second bases (10,20) will automatically move to an original position with the concave surface (11) in the first base (10), the concave surface (22) in the sliding channel (21) in the second base (20) and the connecting device (30), such that the shock suppressor has an automatic positioning effect to an original status.

Figure 2:
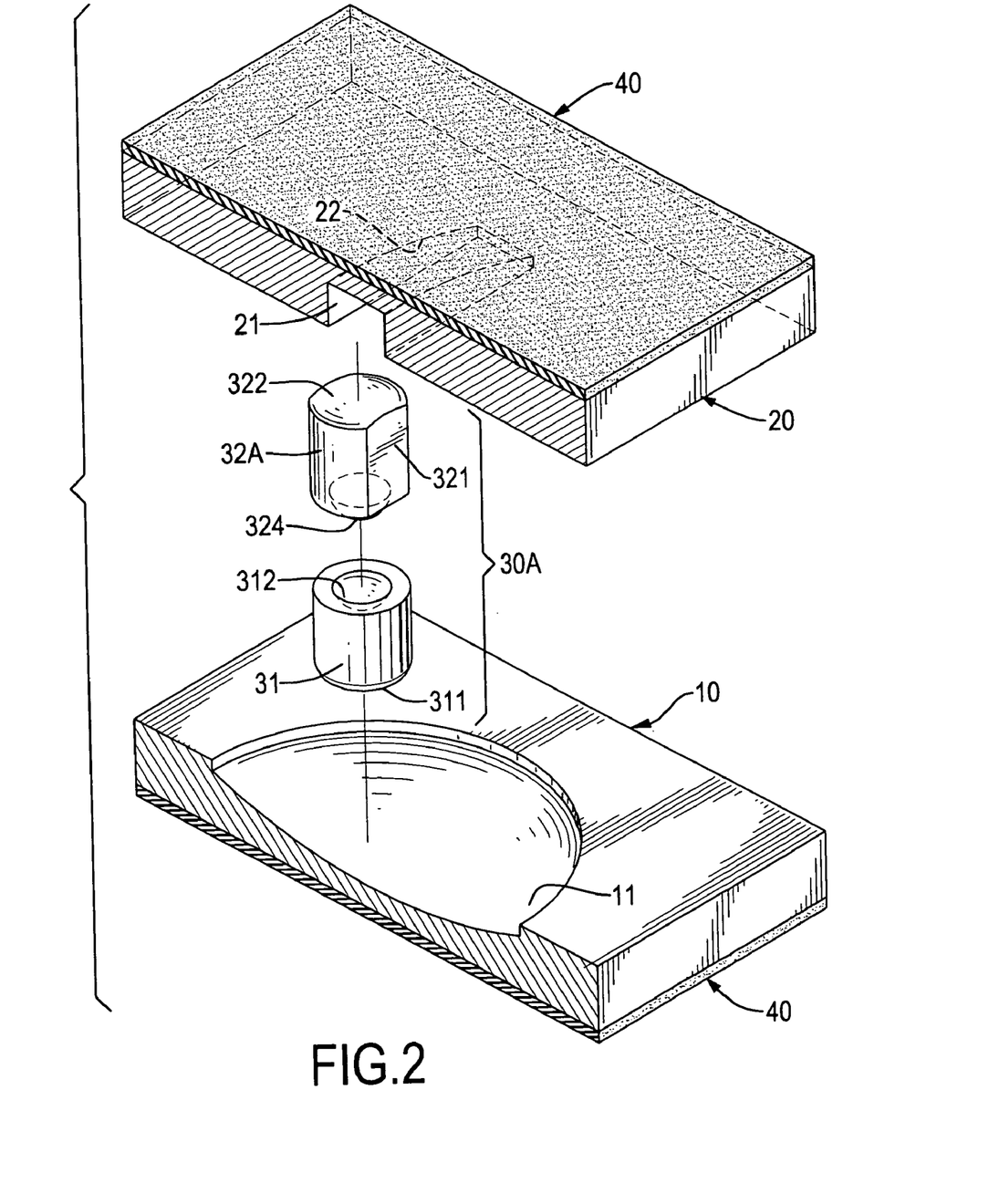
FIG. 2 is an exploded perspective view in partial cross section of a second embodiment of a shock suppressor in accordance with the present invention.

With reference to FIG. 2, the second embodiment of the shock suppressor has a structure substantially same as that in the first embodiment except that the universal connector of the connecting device (30A) comprises a recess (312) defined in the facing end of the first slider (31) and a convex protrusion (324) formed on the facing end of the second slider (32A) and rotatably held in the recess (312) in the first slider (31). The recess (312) in the first slider (31) and the convex protrusion (324) on the second slider (32A) are hemispherical.

Figure 3:
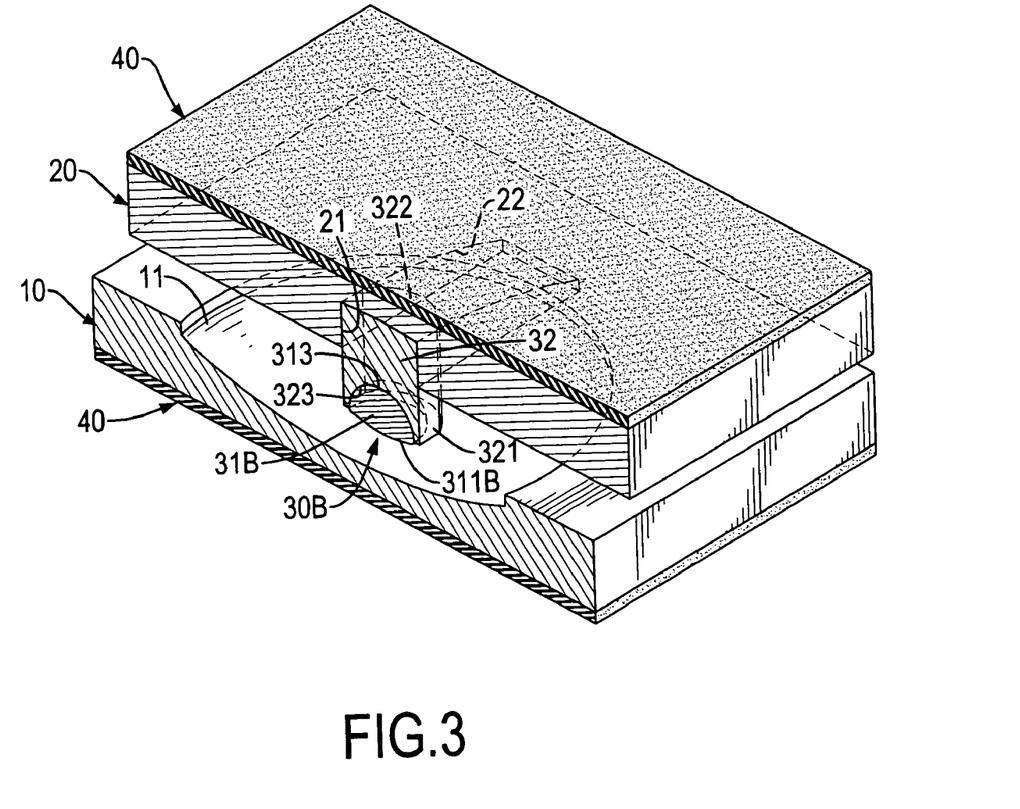
FIG. 3 is a perspective view in partial cross section of a third embodiment of a shock suppressor in accordance with the present invention.

With reference to FIG. 3, the third embodiment of the shock suppressor has a structure substantially same as that in the first embodiment except that the universal connector of the connecting device (30B) comprises a recess (323) defined in the facing end of the second slider (32) and a convex surface (313) formed on the facing end of the first slider (31B) and rotatably held in the recess (323) in the second slider (32). The recess (323) in the second slider (32) is hemispherical, and the first slider (31B) is a hemispherical block with a hemispherical convex surface (313) rotatably held in the recess (323) in the second slider (32).

Figure 4:
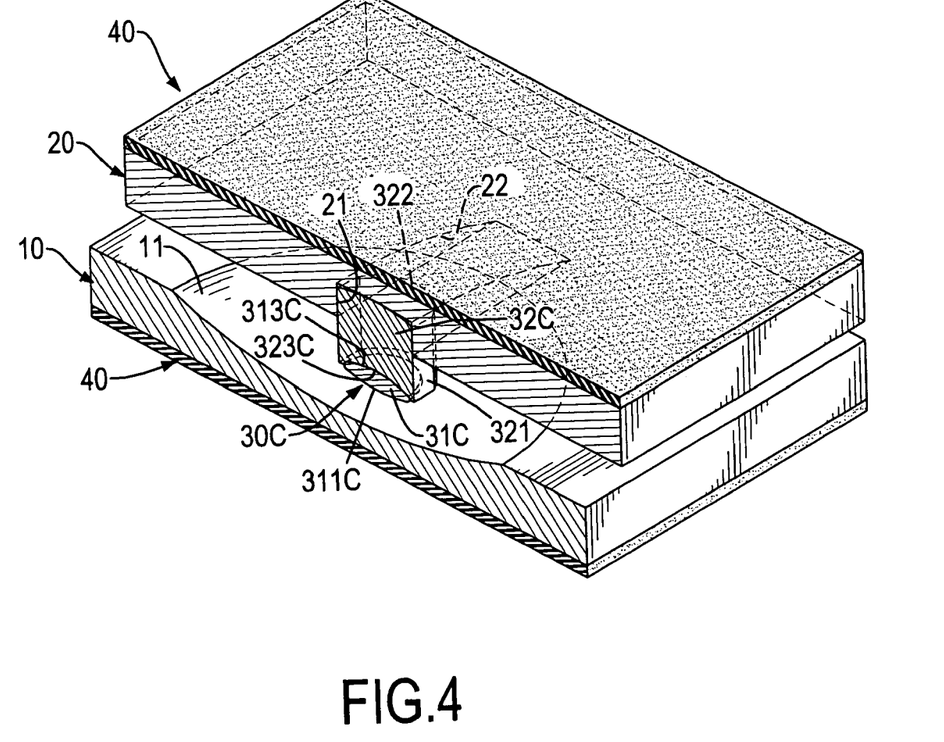
FIG. 4 is a perspective view in partial cross section of a fourth embodiment of a shock suppressor in accordance with the present invention.

With reference to FIG. 4, in the fourth embodiment of the shock suppressor, the first slider (31C) of the connecting device (30C) is a flat round block, the recess (323C) in the second slider (32C) is a flat concave recess, and the convex surface (313C) on the first slider (31C) is a flat convex surface.

Figure 5:
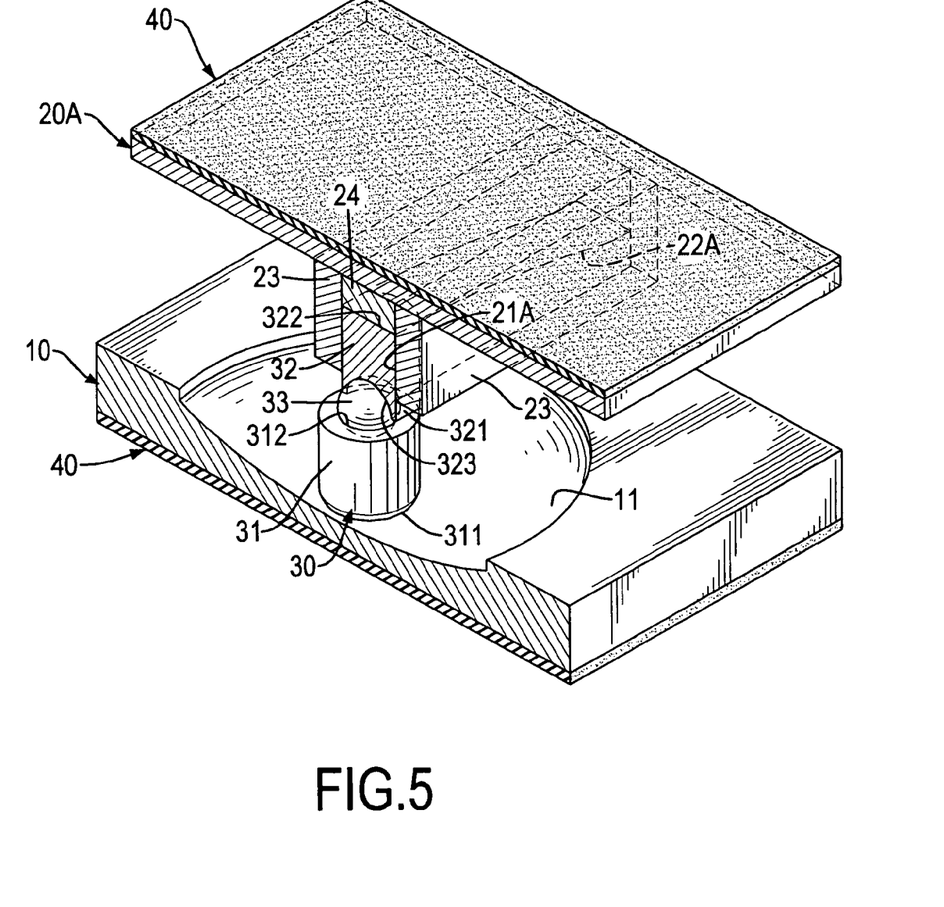
FIG. 5 is a perspective view in partial cross section of a fifth embodiment of a shock suppressor in accordance with the present invention.

With reference to FIG. 5, in the fifth embodiment of the shock suppressor, the second base (20A) has two parallel side plates (23) formed on and extending from the side facing the first base (10) and a guiding block (24) mounted between the side plates (23) to define the sliding channel (21A) between the side plates (23) and the guiding block (24). The guiding block (24) has a concave surface (22A) facing the first base (10) and corresponding to and matching with the convex surface (322) on the second slider (32).

Figure 6:
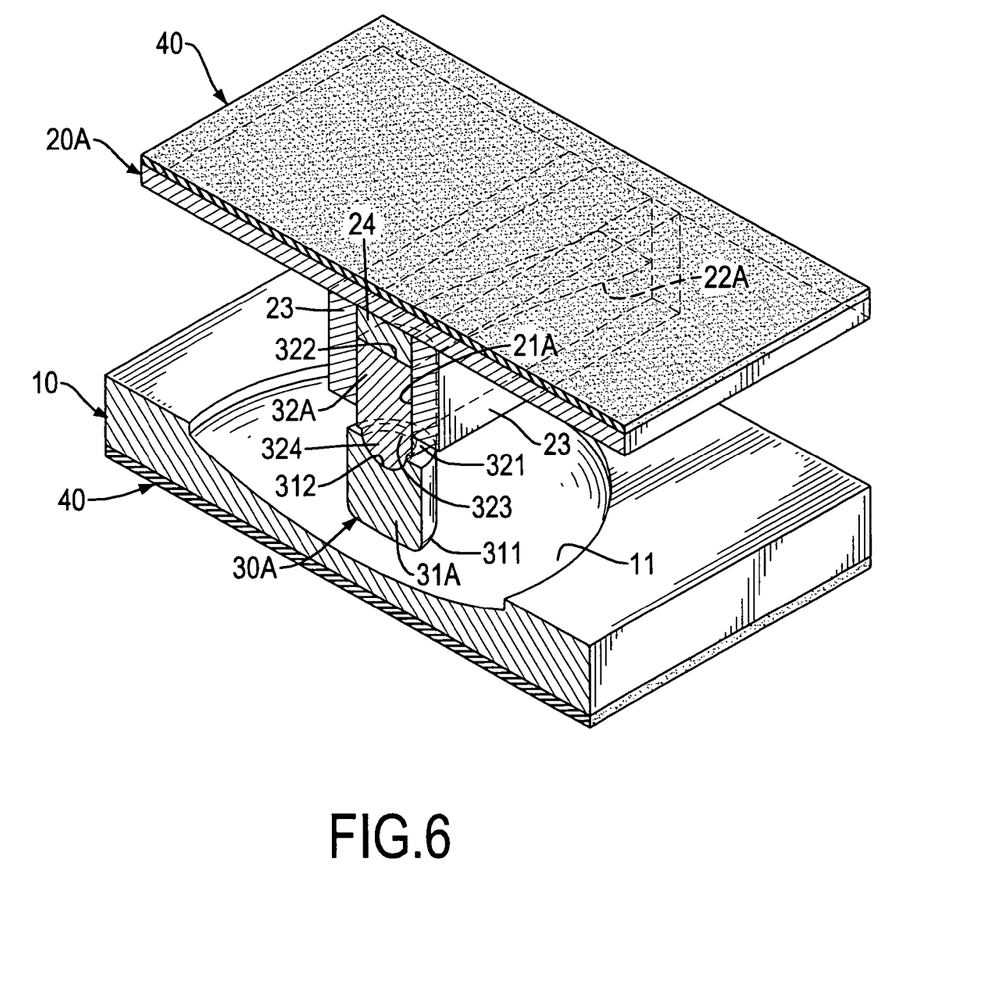
FIG. 6 is a perspective view in partial cross section of a sixth embodiment of a shock suppressor in accordance with the present invention.

With reference to FIG. 6, in the sixth embodiment of the shock suppressor, the universal connector of the connecting device (30A) comprises a hemispherical recess (312) defined in the facing end of the first slider (31A) and a hemispherical convex protrusion (324) formed on the facing end of the second slider (32A) and rotatably held in the recess (312) in the first slider (31A).

Figure 7:
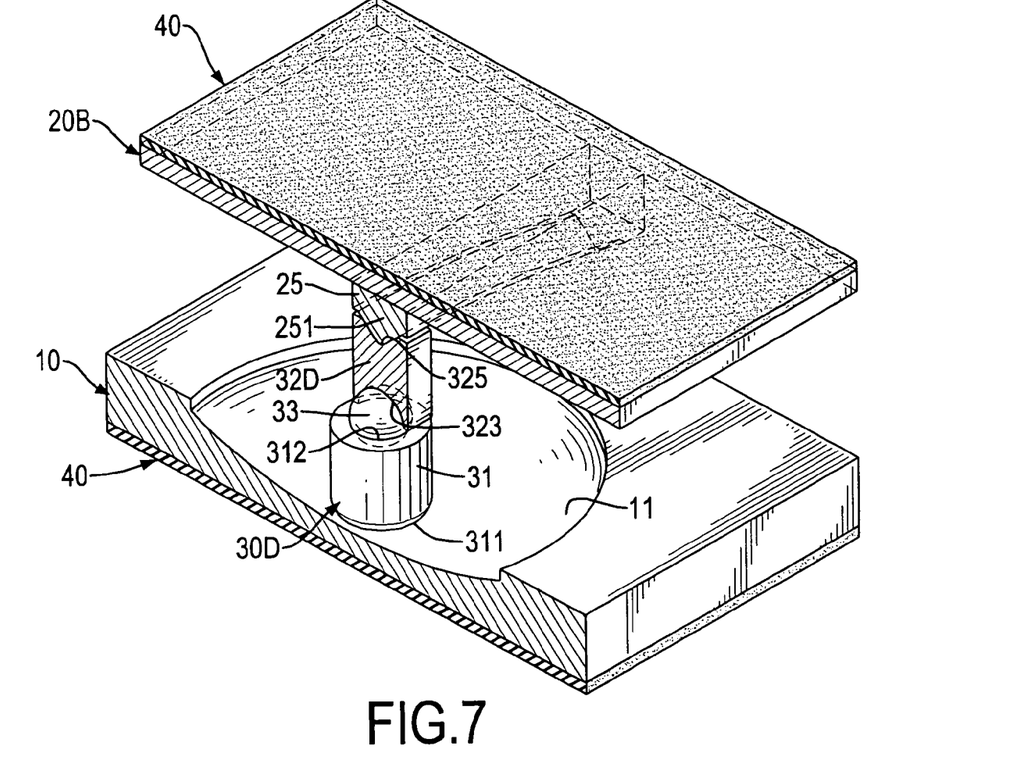
FIG. 7 is a perspective view in partial cross section of a seventh embodiment of a shock suppressor in accordance with the present invention.
Figure 7A:
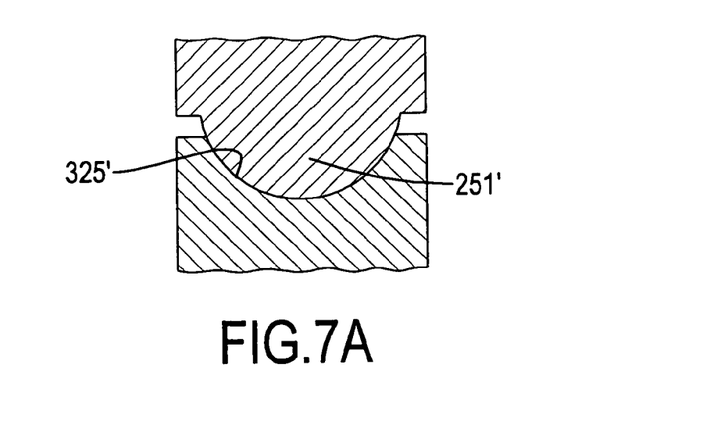
FIG. 7A is an enlarged side view in partial cross section of an alternative embodiment of a rib and an engaging channel of the shock suppressor in FIG. 7.
Figure 9:
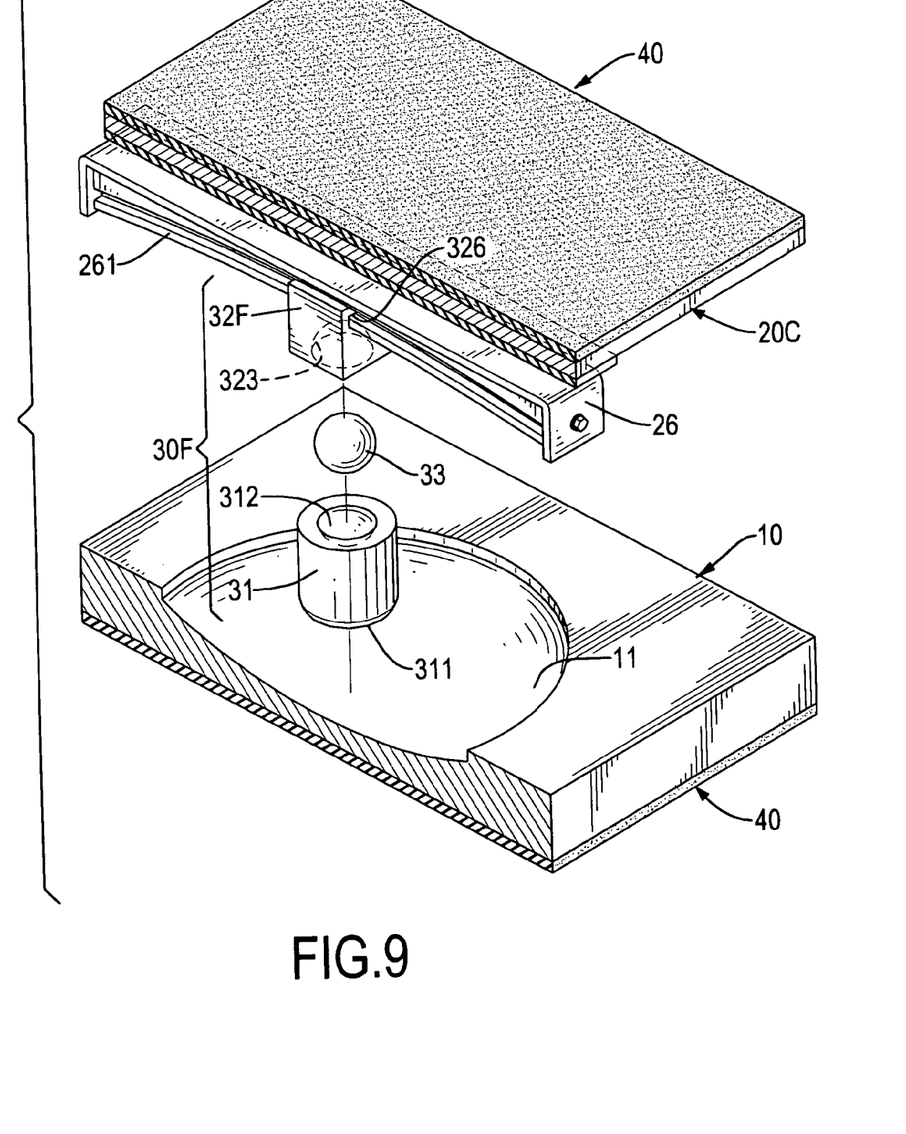
FIG. 9 is an exploded perspective view in partial cross section of a ninth embodiment of a shock suppressor in accordance with the present invention.

With reference to FIG. 7, in the seventh embodiment of the shock suppressor, the second base (20B) has a rail (25) attached to the side facing the first base (10). The rail (25) has a curved rib (251) with a concave surface facing the first base (10). The second slider (32D) of the connecting device (30D) has an engaging channel (325) corresponding to and matching with the curved rib (251) on the rail (25). In the seventh embodiment, the curved rib (251,251') of the rail (25) on the second base (20B) and the engaging channel (325,325') in the second slider (32D) may have a V-shaped cross section, a semispherical cross section as shown in FIG. 7A or an inverse T-shaped cross section as shown in FIG. 9. Accordingly, the second sliding mechanism in a unidirectional sliding direction is constructed of the rib (251) and the engaging channel (325).

Figure 8:
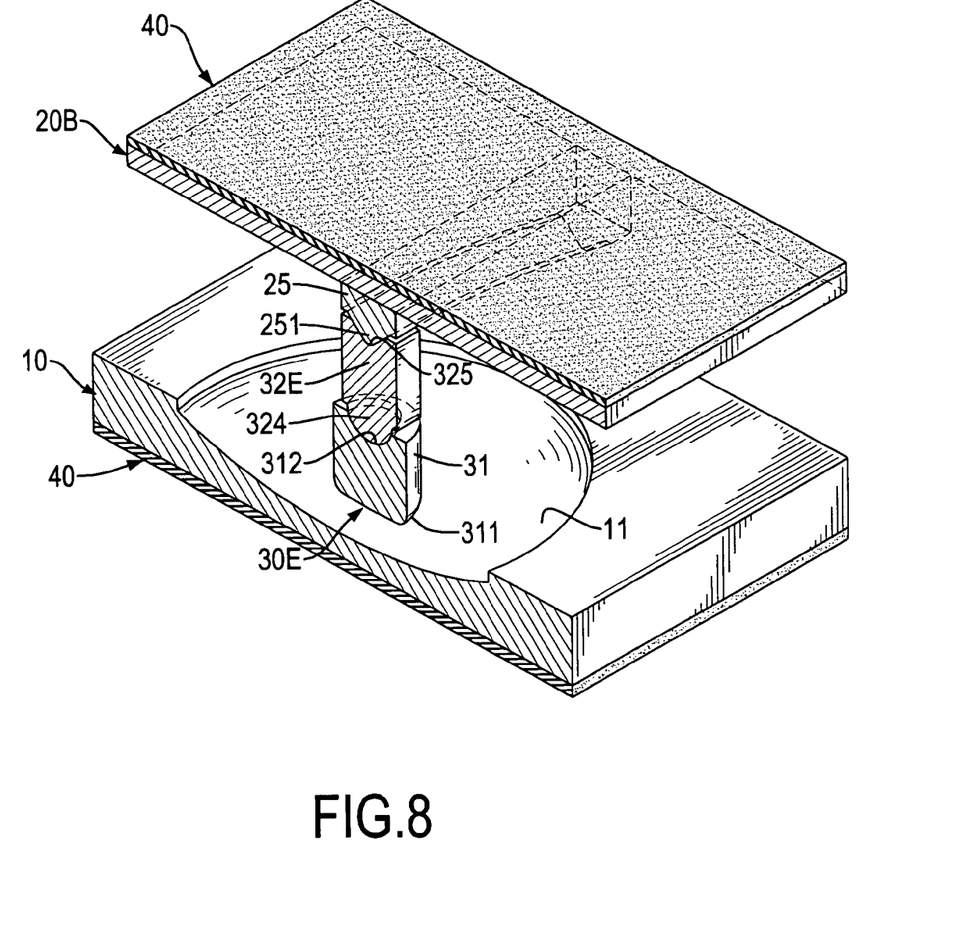
FIG. 8 is a perspective view in partial cross section of an eighth embodiment of a shock suppressor in accordance with the present invention.

With reference to FIG. 8, the eighth embodiment of the shock suppressor has a structure substantially same as that in the seventh embodiment except that the universal connector of the connecting device (30E) comprises a hemispherical recess (312) defined in the facing end of the first slider (31) and a hemispherical convex protrusion (324) formed on the facing end of the second slider (32E) and rotatably held in the recess (312) in the first slider (31).

With reference to FIG. 9, in the ninth embodiment of the shock suppressor, the rib (261) of the rail (26) on the second base (20C) and the engaging channel (326) in the second slider (32F) of the connecting device (30F) have an inverse T-shaped cross section.

Figure 10:
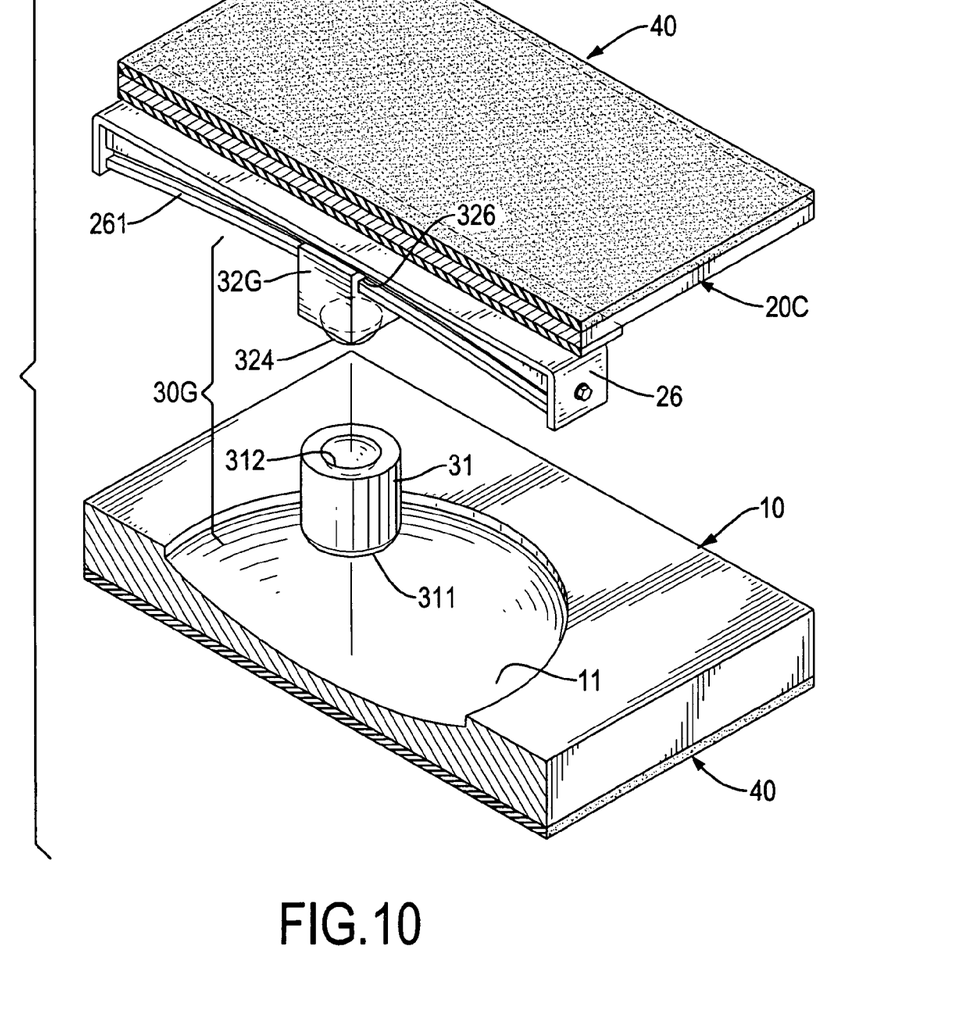
FIG. 10 is an exploded perspective view in partial cross section of a tenth embodiment of a shock suppressor in accordance with the present invention.

With reference to FIG. 10, the tenth embodiment of the shock suppressor has a structure substantially same as that in the ninth embodiment except that the universal connector of the connecting device (30G) comprises a hemispherical recess (312) defined in the facing end of the first slider (31) and a hemispherical convex protrusion (324) formed on the facing end of the second slider (32G) and rotatably held in the recess (312) in the first slider (31).

Figure 11:
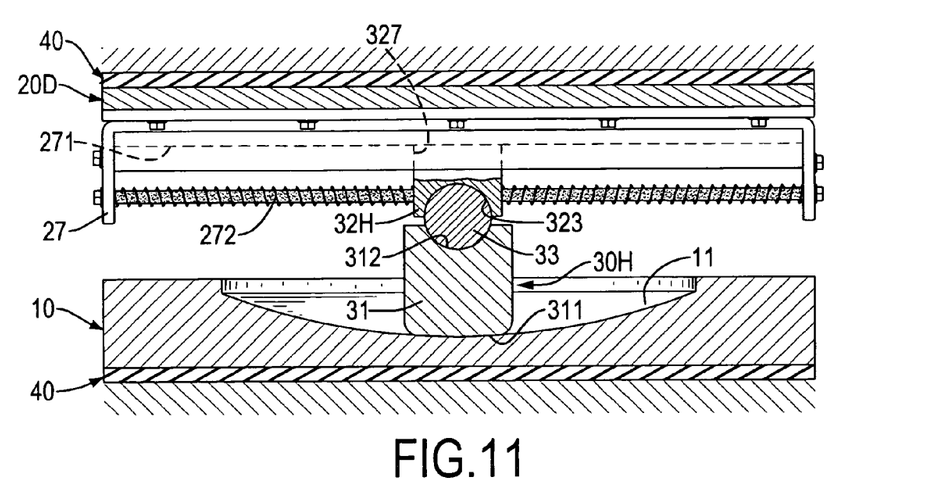
FIG. 11 is a side view in partial cross section of an eleventh embodiment of a shock suppressor in accordance with the present invention.

With reference to FIG. 11, in the eleventh embodiment of the shock suppressor, the rail (27) on the second base (20D) further has a flat and unidirectional rib (271) matching and engaging with an engaging channel (327) defined in the second slider (32H) of the connecting device (30H). The rail (27) further has a bar extending through the second slider (32H) and two resilient members (272) mounted around the bar and abutting against the second slider (32H). The resilient members (272) may be springs, plastic sleeves or cylinders. With the arrangement of the resilient members (272), the resilient members (272) can provide a recoil force to the second slider (32H) to make the connecting device (30H) to move automatically to the original status.

Figure 12:
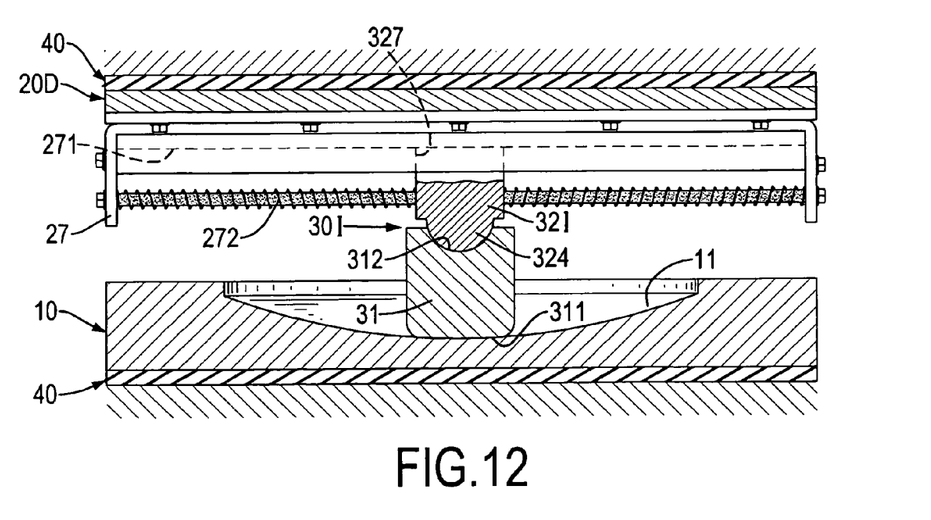
FIG. 12 is a side view in partial cross section of a twelfth embodiment of a shock suppressor in accordance with the present invention.
Figure 13:
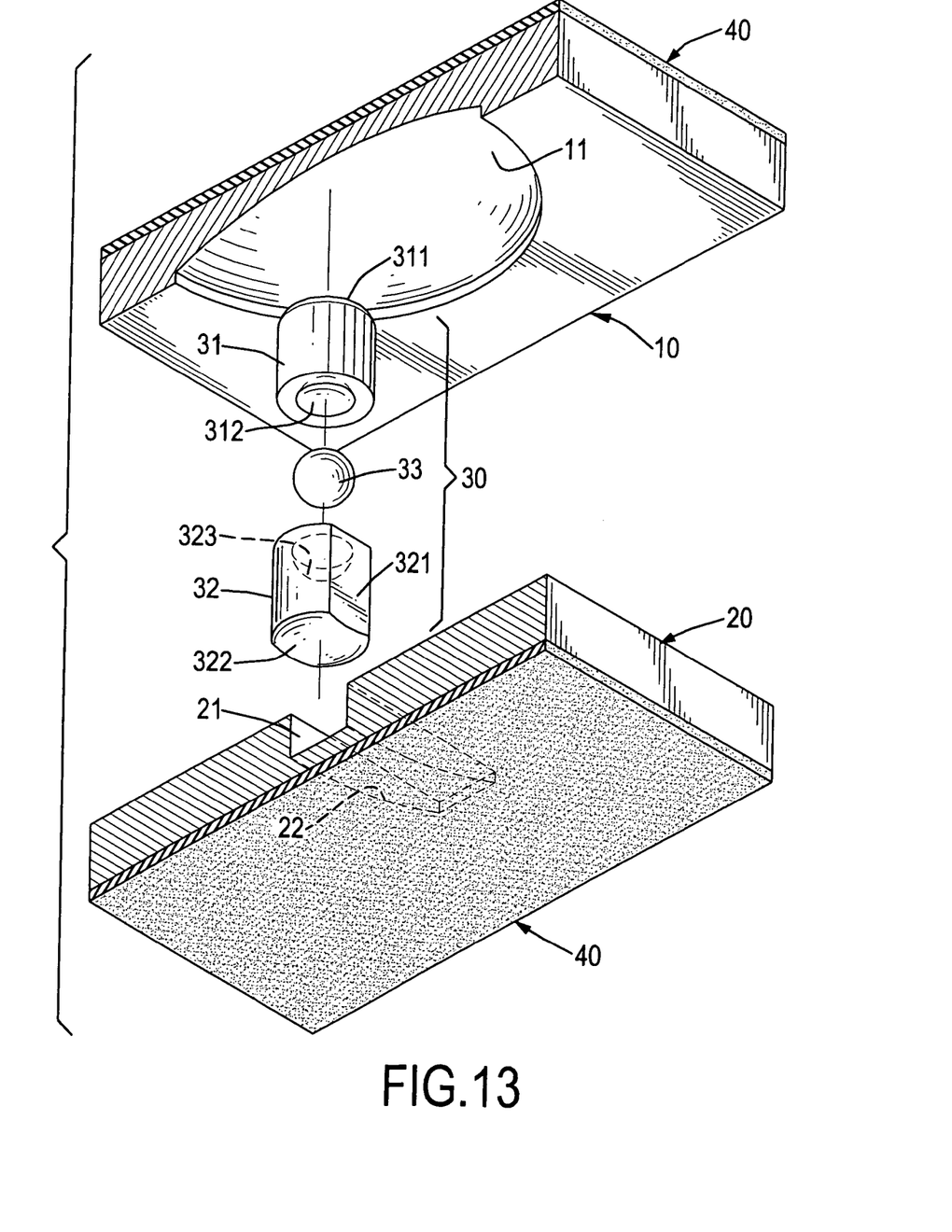
FIG. 13 is an exploded perspective view in partial cross section of a thirteenth embodiment of a shock suppressor in accordance with the present invention.

With reference to FIG. 12, the twelfth embodiment of the shock suppressor has a structure substantially same as that in the eleventh embodiment except that the universal connector of the connecting device (301) comprises a hemispherical recess (312) defined in the facing end of the first slider (31) and a hemispherical convex protrusion (324) formed on the facing end of the second slider (32I) and rotatably held in the recess (312) in the first slider (31).

With such an arrangement, shock energy in multiple directions can be efficiently dissipated by the shock suppressor in accordance with the present invention. Additionally, with the first sliding mechanism in a universal direction and the second sliding mechanism in a unidirectional sliding direction, the displacement capacities and shock-dissipating frequencies in different direction are different. Therefore, the shock suppressor can be applied to bridges or elongated building and is versatile in use.

Furthermore, the shock suppressor has a simplified structure, such that to manufacture and assemble the shock suppressor is easy and convenient and the cost for manufacturing the shock suppressor can be reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A shock suppressor comprising:
a first base;
a second base parallel to the first base; and
a connecting device slidably mounted between the first base and second base to connect the first and second bases and having a connector,
wherein, the first base abuts against the connecting device in a curved contact surface;
the second base abuts against the connecting device;
the first base has a concave surface defined in a side facing the second base and having a circular periphery;
the connecting device has a convex surface formed on one end of the connecting device, corresponding to and matching with the concave surface in the first base to enable the connecting device to move relative to the first base in multiple directions and further comprises
a first slider abutting against the first base and having a facing end; and
a second slider abutting against the second base and having a facing end, wherein the facing ends of the first and second sliders face to each other; and
the connector is formed between the first slider and the second slider and comprises
a recess defined in the facing end of the first slider; and
a convex protrusion formed on the facing end of the second slider and rotatably held in the recess in the first slider, wherein
the first base is parallel with the second base;
the second base has a sliding channel defined in a side facing the first base;
the sliding channel has a concave surface facing the first base and two inner sides; and
the connecting device has a convex surface formed on one end of the connecting device and corresponding to and matching with the concave surface in the sliding channel of the second base and having two guiding sides respectively abutting against the inner sides of the sliding channel.

2. The shock suppressor as claimed in claim 1, wherein the recess in the first slider and the convex protrusion on the second slider are hemispherical.

3. The shock suppressor as claimed in claim 1, wherein the first base is mounted below the second base.

4. The shock suppressor as claimed in claim 1, wherein the second base is mounted below the first base.

5. The shock suppressor as claimed in claim 1 further comprising a damping device mounted on at least one of the first base, the second base and the connecting device.

6. The shock suppressor as claimed in claim 2 further comprising a damping device mounted on at least one of the first base, the second base and the connecting device.

7. The shock suppressor as claimed in claim 3 further comprising a damping device mounted on at least one of the first base, the second base and the connecting device.

8. The shock suppressor as claimed in claim 4 further comprising a damping device mounted on at least one of the first base, the second base and the connecting device.

* * * * *